(12) United States Patent
Gu et al.

(10) Patent No.: US 12,207,000 B2
(45) Date of Patent: Jan. 21, 2025

(54) SHOOTING METHOD AND DEVICE AND STORAGE MEDIUM

(71) Applicant: Beijing Xiaomi Mobile Software Co., Ltd., Beijing (CN)

(72) Inventors: Yuqing Gu, Beijing (CN); Zhihui Zhang, Beijing (CN); Guohao Yang, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 0 days.

(21) Appl. No.: 17/733,511

(22) Filed: Apr. 29, 2022

(65) Prior Publication Data

US 2023/0209212 A1 Jun. 29, 2023

(30) Foreign Application Priority Data

Dec. 28, 2021 (CN) .......................... 202111627455.2

(51) Int. Cl.
*H04N 23/80* (2023.01)
*G06F 21/62* (2013.01)
(Continued)

(52) U.S. Cl.
CPC .......... *H04N 23/80* (2023.01); *G06F 21/629* (2013.01); *H04N 23/45* (2023.01); *H04N 23/63* (2023.01)

(58) Field of Classification Search
CPC ........ H04N 23/80; H04N 23/63; H04N 23/45; G06F 21/629; G06F 21/54;
(Continued)

(56) References Cited

U.S. PATENT DOCUMENTS 11,698,822 B2 * 7/2023 Charlton ................. G06F 9/541
345/633
2007/0070204 A1 * 3/2007 Mentzer ................. H04N 23/45
348/E5.025
(Continued)

FOREIGN PATENT DOCUMENTS

CN 113727035 A * 11/2021

OTHER PUBLICATIONS

Extended European Search Report dated Oct. 14, 2022 for European Application No. 22170805.0.

*Primary Examiner* — Antoinette T Spinks
(74) *Attorney, Agent, or Firm* — Volpe Koenig

(57) ABSTRACT

A shooting method, performed by an electronic device, the electronic device includes an operating system and is provided with a functional camera, an application layer of the electronic device is provided with a third-party application, and the shooting method includes: in response to a shooting operation on a shooting interface of the third-party application, sending a data processing request to a framework layer of the operating system by the third-party application, the data processing request being a request for indicating to process initial image data collected by the functional camera; sending the data processing request to a hardware abstraction layer of the operating system by the framework layer; and processing the initial image data by the hardware abstraction layer in response to the data processing request to obtain target image data, and sending the target image data to the third-party application by the hardware abstraction layer.

19 Claims, 8 Drawing Sheets

(51) Int. Cl.
*H04N 23/45* (2023.01)
*H04N 23/63* (2023.01)

(58) Field of Classification Search
CPC ...... G06F 21/6281; G06F 21/44; G06F 21/55; G06F 21/577; G06F 21/60; G06F 2221/2141; Y02D 30/70
USPC .............................................. 348/222.1, 319
See application file for complete search history.

(56) References Cited

U.S. PATENT DOCUMENTS

2018/0365004 A1* 12/2018 Chen ........................ G06F 9/541
2019/0034624 A1*  1/2019 Chen ........................ G06F 21/60
2020/0349749 A1* 11/2020 Huang ............... H04N 21/4223
2021/0389996 A1* 12/2021 Charlton ................. G06F 9/451
2022/0201201 A1*  6/2022 Chen ..................... H04N 23/64

* cited by examiner

SHOOTING METHOD AND DEVICE AND STORAGE MEDIUM

CROSS-REFERENCE TO RELATED APPLICATION

The present application is based on and claims priority to the Chinese Patent Application No. 2021116274552, filed on Dec. 28, 2021, the entire contents of which are incorporated herein by reference.

BACKGROUND

With the development of the technology of electronic device, the image processing technology of the electronic device has become very mature. Most of the electronic devices are integrated with a plurality of cameras to meet the shooting requirements of different focal lengths. For example, the cameras commonly used in the electronic devices include ultra-wide-angle cameras, telephoto cameras and other cameras with setting functions.

SUMMARY

The disclosure provides a shooting method and device and a storage medium.

According to a first aspect of the disclosure, there is provided a shooting method which is performed by an electronic device, the electronic device includes an operating system and is provided with a functional camera, and an application layer of the electronic device is provided with a third-party application, the method includes:

in response to a shooting operation on a shooting interface of the third-party application, sending a data processing request to a framework layer of the operating system by the third-party application, the data processing request being a request for indicating to process initial image data collected by the functional camera;

sending the data processing request to a hardware abstraction layer of the operating system by the framework layer; and processing the initial image data by the hardware abstraction layer in response to the data processing request to obtain target image data, and sending the target image data to the third-party application by the hardware abstraction layer.

According to a second aspect of the disclosure, there is provided a shooting device which is applied to an electronic device, the electronic device includes an operating system and is provided with a functional camera, an application layer of the electronic device is provided with a third-party application, and the shooting device includes:

a sending module, configured to control the third-party application to send a data processing request to a framework layer of the operating system in response to a shooting operation on a shooting interface of the third-party application, the data processing request being a request for indicating to process initial image data collected by the functional camera, and the sending module is further configured to control the framework layer to send the data processing request to a hardware abstraction layer of the operating system; and a processing module, configured to control the hardware abstraction layer to process the initial image data in response to the data processing request to obtain target image data, and to control the hardware abstraction layer to send the target image data to the third-party application.

According to a third aspect of the disclosure, there is provided a shooting device, comprising:

a processor; and a memory, configured to store processor executable instructions;

wherein the processor is configured to implement the steps of the method according to any one of the first aspect.

According to a fourth aspect of the disclosure, there is provided a non-transitory computer readable storage medium on which computer program instructions are stored, and when the program instructions are executed by a processor, the steps of the shooting method according to the first aspect of the disclosure are realized.

It should be understood that the general description and the detailed description of the following text are examples and explanatory, and are not used to limit the disclosure.

BRIEF DESCRIPTION OF THE DRAWINGS

The drawings herein are incorporated into and constitute part of the description, illustrating examples conforming to the disclosure, and used together with the description to interpret the principles of the disclosure.

DETAILED DESCRIPTION

Figure 1:
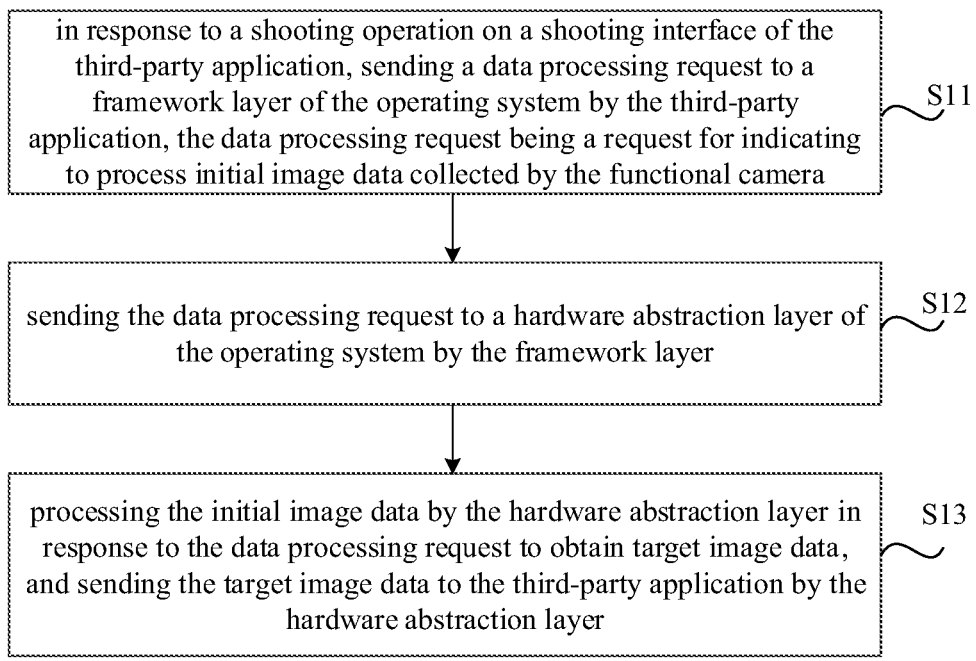
FIG. 1 is a flow chart of a shooting method according to an example.

Examples will be described in detail here, examples of which are represented in the drawings. When the following description relates to drawings, the same numbers in different drawings represent the same or similar elements unless otherwise indicated. Implementations described in the following examples do not represent all the implementations consistent with the disclosure. Instead, they are examples of devices and methods consistent with some aspects of the disclosure.

At present, under an existing system architecture of the electronic device, the above-mentioned camera with a setting function can only be accessed by a camera application built in the electronic device, and a third-party application cannot access or use the above-mentioned camera with the setting function.

FIG. 1 is a flow chart of a shooting method according to an example. As shown in FIG. 1, the shooting method is performed by an electronic device and includes the following steps.

In step S11, a third-party application sends a data processing request to a framework layer of an operating system in response to a shooting operation on a shooting interface of the third-party application, and the data processing request is a request for indicating to process initial image data collected by a functional camera.

The electronic device can include an operating system, the electronic device is provided with a functional camera with a setting function, and an application layer of the electronic device is provided with a third-party application. The operating system can be an Android system, an IOS system, a Linux system and the like. The third-party application can be a third-party camera application, such as Meitu Xiu, BeautyCam and Camera FV5, and can also be an application capable of calling a camera function.

The setting function refers to a preset function of the functional camera, such as an Ultra-Wide-Angle-Shooting Function, a Telephoto-Shooting Function, an Ultra-Telephoto-Shooting Function, a Macro-Shooting Function, a Multi-Camera Simultaneous Opening Function, and a Smooth-Zoom Function, etc.

Figure 3:
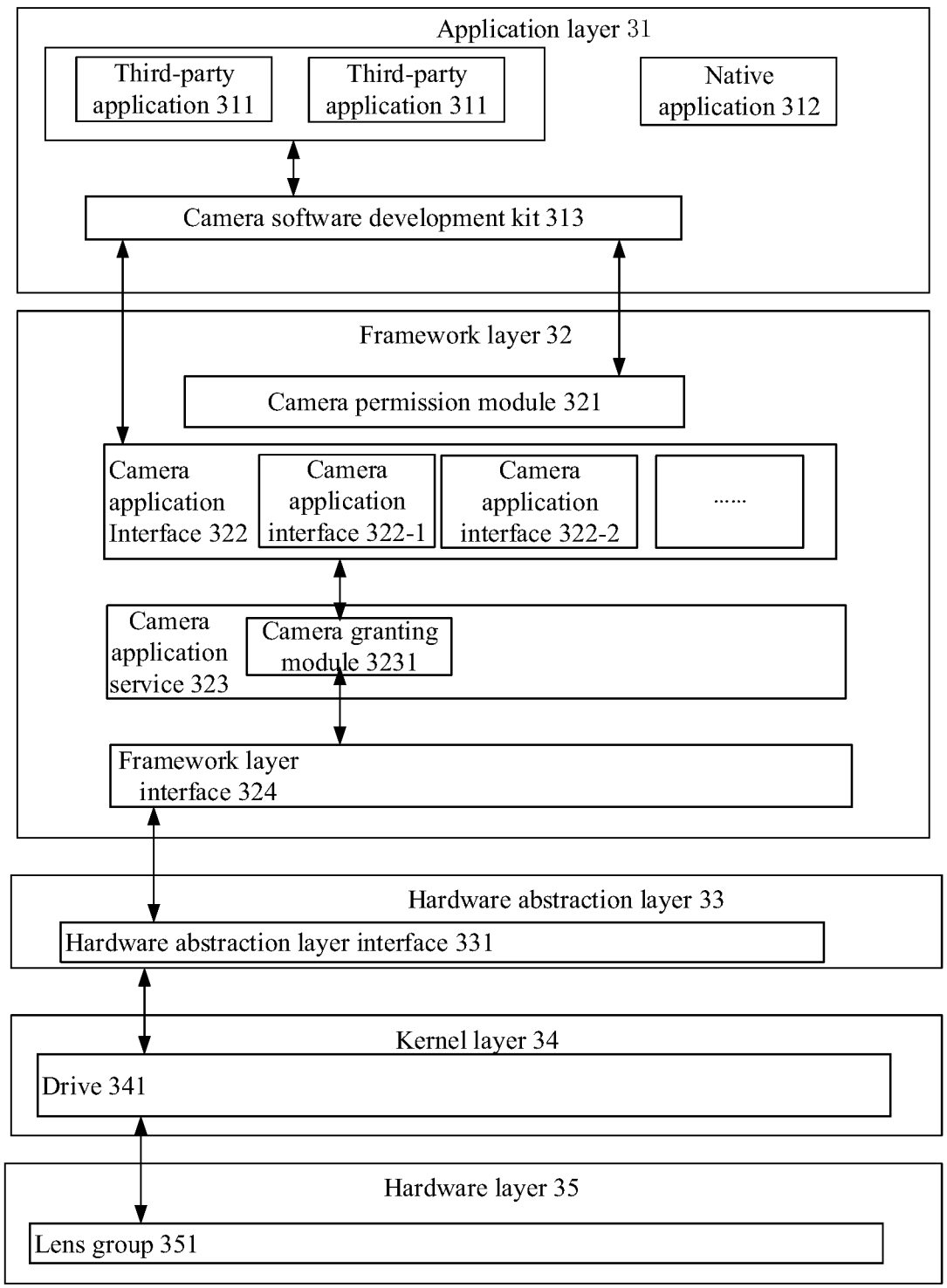
FIG. 3 is a schematic diagram of a software architecture of an operating system according to an example.

In an example of the disclosure, as shown in FIG. 3, taking Android as the operating system as an example, an application layer of the operating system is provided with a camera software development kit (SDK), a third-party application of the operating system is integrated with the SDK, and the third-party application sends data processing request to a framework layer of the operating system through the SDK.

For example, the functional camera may include at least one of an ultra-wide-angle camera, a telephoto camera, an ultra-telephoto camera, and a macro camera.

In step S12, the framework layer sends the data processing request to a hardware abstraction layer of the operating system.

In step S13, the hardware abstraction layer processes the initial image data in response to the data processing request to obtain target image data, and sends the target image data to the third-party application.

In an example of the disclosure, in response to the shooting operation on the shooting interface of the third-party application, the processing request for processing the initial image data collected by the functional camera can be sent to the hardware abstraction layer of the operating system through the third-party application, and the hardware abstraction layer processes the initial image data in response to the data processing request to obtain the target image data and sends the target image data to the third-party application, so that the third-party application calls the functional camera for shooting, and the richness of shooting through the third-party application is improved.

Figure 2:
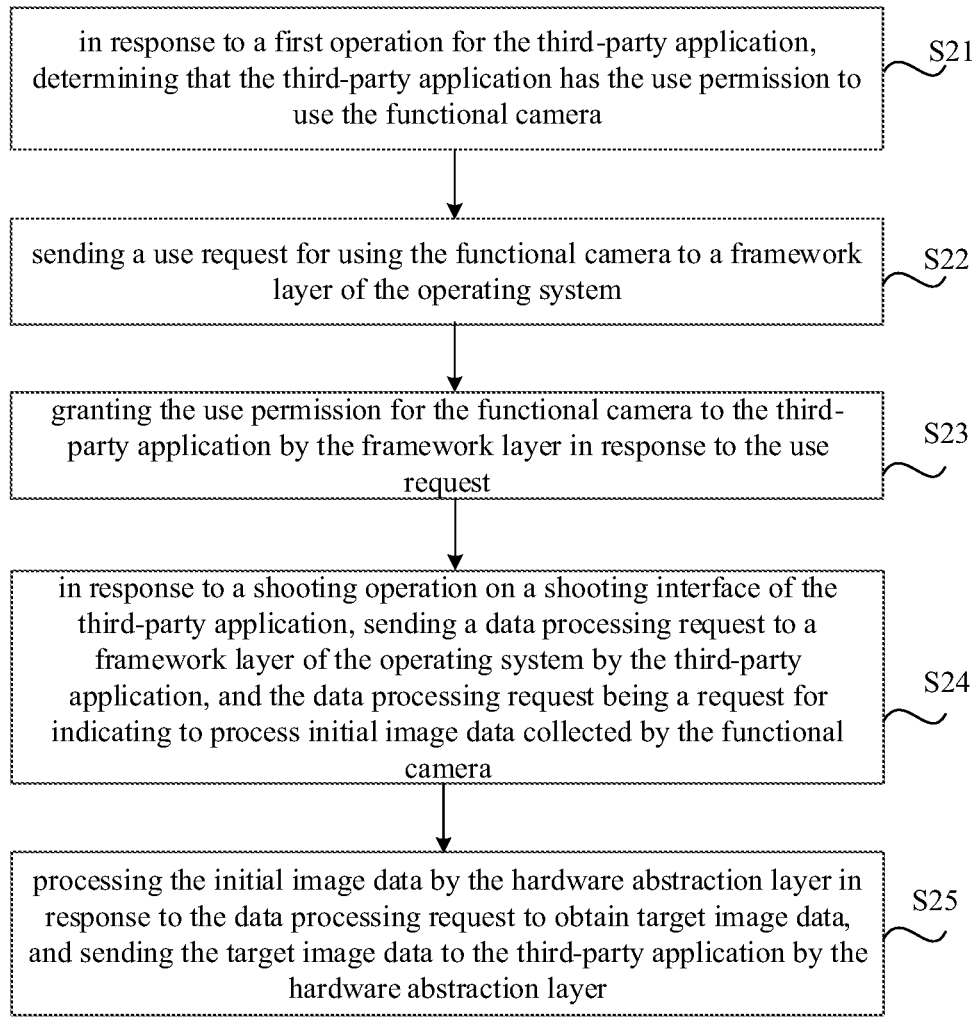
FIG. 2 is a flow chart of a shooting method according to an example.

FIG. 2 is a flow chart of a shooting method according to an example. As shown in FIG. 2, the shooting method is performed by an electronic device and includes the following steps.

In step S21, in response to a first operation for the third-party application, it is determined that the third-party application has the use permission to use the functional camera.

In the case that the third-party application is a third-party camera application, the first operation may be, for example, an operation to turn on the third-party application to run the third-party application. Or, in the case that the third-party application is an application capable of calling the camera function, the first operation can be an operation of calling the shooting function through the third-party application, or an operation of enabling the third-party application to enter the shooting interface.

In one implementation, in response to the first operation for the third-party application, the use request for using the functional camera can be sent to the framework layer of the operating system. The framework layer grants the use permission to use the functional camera to the third-party application in response to the use request, so that the third-party application also has the capability of using the functional camera, a user can shoot by calling the functional camera, and the richness of shooting through the third-party application is improved.

An application layer of the operating system is provided with a camera software development kit (SDK), the SDK is integrated in the third-party application, and the framework layer is provided with a camera permission module.

The third-party application is integrated with the SDK. After the third-party application is installed on the electronic device, the SDK is configured in the application layer of the operating system.

For example, it can be determined that the third-party application has the use permission to use the functional camera in the following manner:
  a query request for querying the use permission is sent to the camera permission module by the SDK; and
  the camera permission module determines that the third-party application has the use permission to use the functional camera in response to the query request, and responds a permission confirmation message to the third-party application.

In step S22, a use request for using the functional camera is sent to a framework layer of the operating system.

In step S23, the framework layer grants the use permission for the functional camera to the third-party application in response to the use request.

In step S24, in response to a shooting operation on a shooting interface of the third-party application, the third-party application sends a data processing request to the framework layer of the operating system, and the data processing request is a request for indicating to process initial image data collected by the functional camera.

In step S25, the framework layer sends the data processing request to a hardware abstraction layer of the operating system, and the hardware abstraction layer processes the initial image data in response to the data processing request to obtain target image data and sends the target image data to the third-party application.

Under the condition of there being a plurality of the functional cameras, granting the use permission for the functional camera to the third-party application further includes: granting the use permission for a Multi-Camera Simultaneous Opening Function for the plurality of the functional cameras to the third-party application.

The Multi-Camera Simultaneous Opening Function has the function of simultaneously obtaining and displaying a shot image of each selected camera.

The data processing request can include a request for indicating to process a first initial image data collected by a first functional camera and a second initial image data collected by a second functional camera, the first functional camera and the second functional camera are functional cameras selected from the plurality of the functional cameras.

In response to the data processing request including a request for indicating to process the first initial image data collected by the first functional camera and the second initial image data collected by the second functional camera, the hardware abstraction layer processes the first initial image data to obtain a first target image data in response to the data processing request and processes the second initial image data to obtain a second target image data in response to the data processing request, and sends the first target image data and the second target image data to the third-party application.

In an example of the disclosure, in response to the shooting operation on the shooting interface of the third-party application, the third-party application determines that the third-party application has the use permission to use the functional camera, and after the use request for using the functional camera is sent to the framework layer of the operating system, the framework layer can grant the Multi-Camera Simultaneous Opening Function for the functional cameras to the third-party application in response to the use request. Based on the Multi-Camera Simultaneous Opening Function, a Multi-Camera Simultaneous Opening shot picture can be realized through the third-party application, so that the richness and intelligence of the operations of third-party application are improved.

The present disclosure takes the operating system of the electronic device as an Android system as an example to explain the shooting method applied by the present disclosure FIG. 3 is a schematic diagram of a software architecture of an operating system according to an example.

In FIG. 3, the native architecture of the operating system can include an application layer 31, a framework layer 32, a hardware abstraction layer 33, a kernel layer 34 and a hardware layer 35. The application layer 31 is provided with a plurality of third-party applications 311 and a native application 312 of the electronic device. The framework layer 32 includes various native application interfaces (such as a camera application interface 322), an application service (e.g., a camera application service 323), and a framework layer interface 324. The hardware abstraction layer 33 includes a hardware abstraction layer interface 331 (e.g., HAL3.0), and the kernel layer 34 includes various drives 341 (e.g., a screen Display drive, an Audio drive and the like). The hardware layer 35 includes various hardware devices (such as cameras with various functions) included in the electronic device.

On the basis of the native architecture, a camera software development kit (SDK) 313 is arranged in the application layer 31, and the SDK 313 is integrated in the third-party application 311. A camera permission module 321 and a camera granting module 3231 are arranged in the framework layer 32 of the operating system.

The third-party application 311 is integrated with the SDK 313. After the third-party application 311 is installed on the electronic device, the SDK 313 is configured in the application layer 31 of the operating system.

In response to a shooting operation on a shooting interface of the third-party application 311, a query request for querying the use permission is sent to the camera permission module 321 by the SDK 313, and the camera permission module 321 determines that the third-party application 311 has the use permission to use the functional camera in response to the query request and responds a permission confirmation message to the third-party application 311. The permission confirmation message can include, for example, identification data of the functional camera, so that the third-party application 311 sends the use request for using the functional camera to the framework layer 32 of the operating system according to the identification data.

Under the condition of there being a plurality of the functional cameras, the camera permission module 321 can also respond a confirmation message of granting a Multi-Camera Simultaneous Opening Function for the plurality of the functional cameras to the third-party application 311.

The framework layer 32 of the operating system further includes a camera granting module 3231, and the camera granting module 3231 is configured to receive the use request sent by the third-party application 311 and to grant the use permission for the functional camera to the third-party application 311 in response to the use request.

In an example, as shown in FIG. 3, after the camera granting module 3231 grants the use permission for the functional camera to the third-party application 311, the third-party application 311 sends a data processing request to the framework layer 32 of the operating system through the SDK 313 in response to the shooting operation on the shooting interface of the third-party application 311. The data processing request is a request for indicating to process initial image data collected by the functional camera. In some examples, the third-party application 311 sends the data processing request to the camera application service 323 of the framework layer 32 through the SDK 313 via the camera application interface 322 of the framework layer 32 of the operating system. The camera application service 323 may be configured with a module for processing the data processing request, such as the camera granting module 3231.

The framework layer 32 sends the received data processing request to the hardware abstraction layer 33 of the operating system. In some examples, the framework layer 32 sends the data processing request received by the camera application service 323 to the hardware abstraction layer 33 via the framework layer interface 324.

The hardware abstraction layer 33 processes the initial image data in response to the data processing request to obtain target image data and sends the target image data to the third-party application 311. In some examples, the hardware abstraction layer 33 interfaces with the kernel layer 34 through the hardware abstraction layer interface 331 in response to the data processing request, and obtains the initial image data captured by the lens group 351 (i.e., the functional camera) in the hardware layer 35 through the drive 341 of the kernel layer 34. The hardware abstraction layer 33 processes the initial image data to obtain the target image data. The hardware abstraction layer 33 sends the target image data to the SDK 313 of the application layer 31 through the framework layer interface 324, the camera application service 323 and the camera application interface 322 of the framework layer 32, after that, the target image data is sent to the third-party application 311 through the SDK 313.

Figure 4:
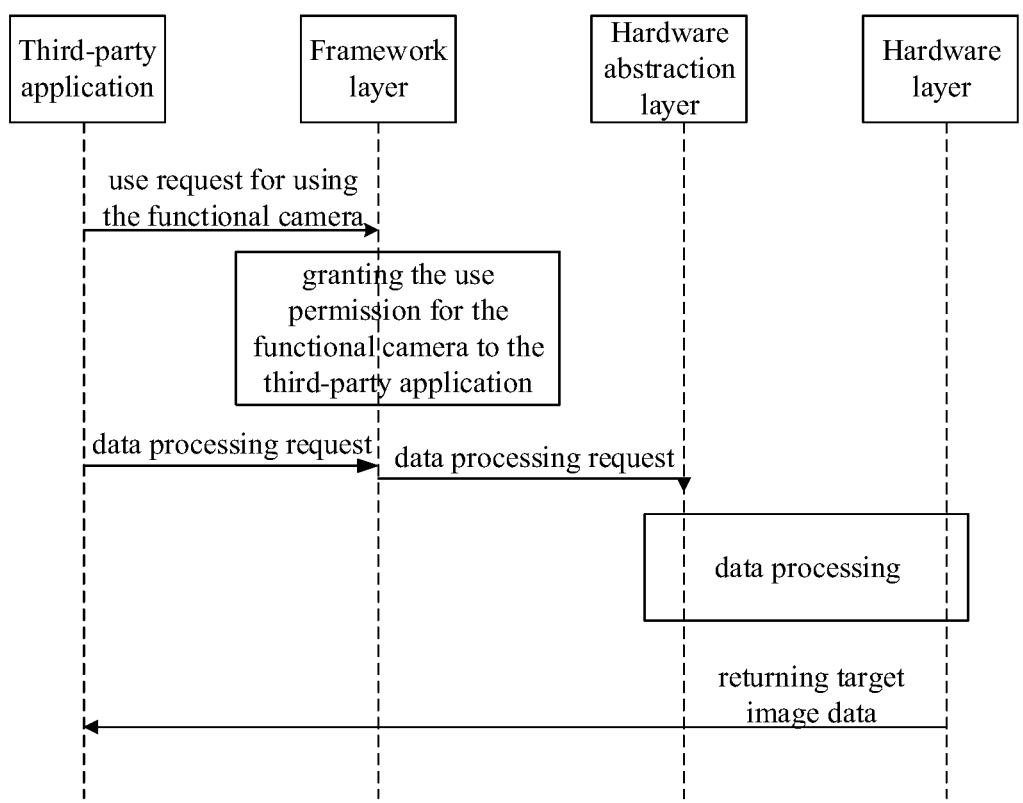
FIG. 4 is a flow schematic diagram of applying the shooting method disclosed by the disclosure according to an example.

FIG. 4 is a flow schematic diagram of applying the shooting method disclosed by the disclosure according to an example.

With reference to FIG. 4, in response to a first operation for the third-party application, the third-party application sends a use request for using the functional camera to the framework layer of the operating system. The framework layer of the operating system performs permission verification on the third-party application in response to the query request, and after it is determined that the third-party application passes the verification, the framework layer sends a permission confirmation information to the third-party application. After it is determined that the third-party application has the use permission to use the functional camera, the framework layer grants the use permission for the functional camera to the third-party application in response to the use request. After that, in response to a shooting operation on a shooting interface of the third-party application, the third-party application sends a data processing request to the framework layer of the operating system, the framework layer sends the data processing request to a hardware abstraction layer of the operating system, and the hardware abstraction layer processes the initial image data to obtain target image data in response to the data processing request and sends the target image data to the third-party application.

Figure 5:
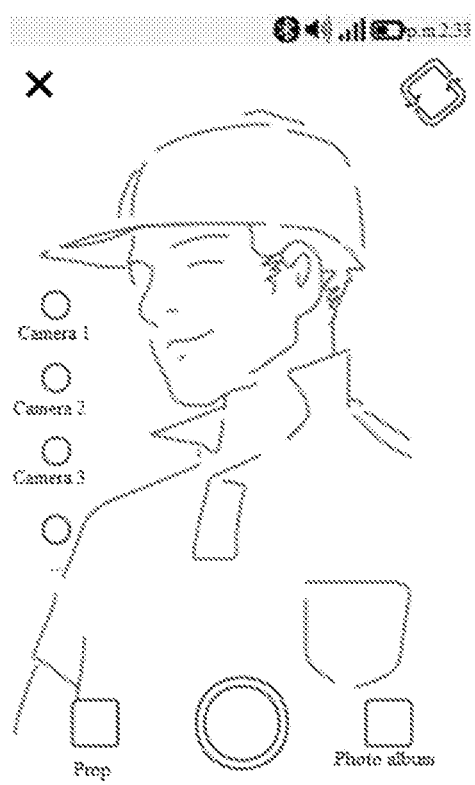
FIG. 5 is a diagram of a shooting method according to an example.
Figure 6:
FIG. 6 is a diagram of a shooting method according to an example.

FIG. 5 and FIG. 6 are diagrams of a shooting method according to an example.

FIG. 5 shows that after the operating system grants the functional cameras to the third-party application, the third-party application displays buttons for the plurality of the functional cameras on its operation interface, such as a camera 1, a camera 2, a camera 3 and the like. A user can select the camera 1, the camera 2 or the camera 3 to shoot images on the operation interface of the third-party application in response to shooting requirements.

FIG. 6 shows that after the operating system grants a Multi-Camera Simultaneous Opening Function for the functional cameras to the third-party application, a preview interface for simultaneously previewing a scene through two functional cameras is displayed on the operation interface of the third-party application.

Figure 7:
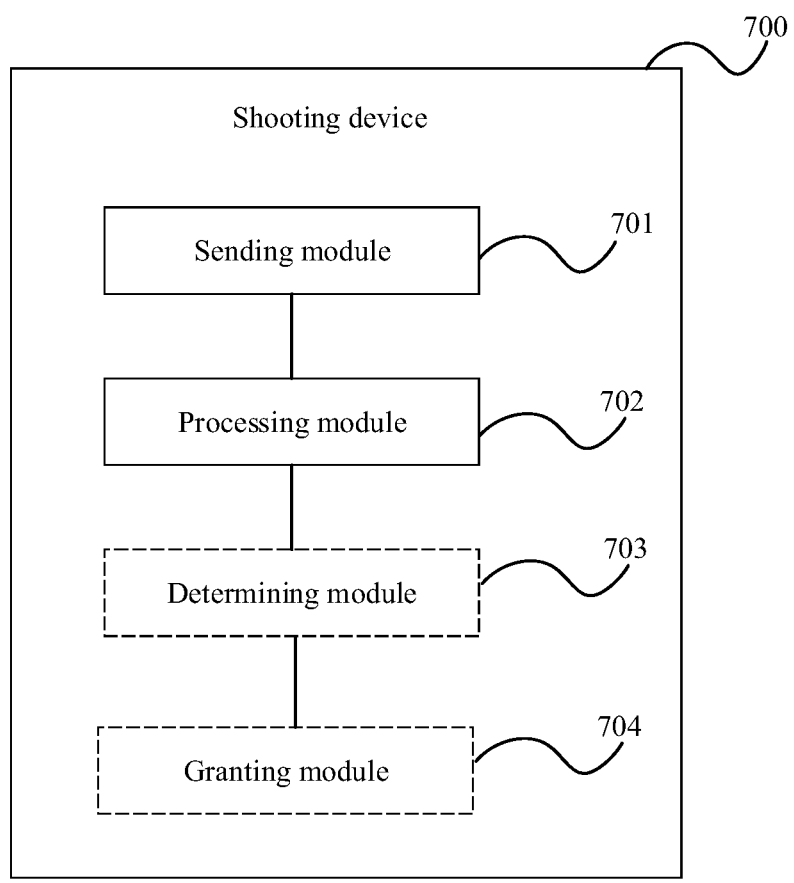
FIG. 7 is a block diagram of a shooting device according to an example.

FIG. 7 is a block diagram of a shooting device 700 according to an example. With reference to FIG. 7, the shooting device is applied to an electronic device. The electronic device includes an operating system and is provided with a functional camera with a setting function, an application layer of the electronic device is provided with a third-party application, and the shooting device 700 includes:
- a sending module 701, configured to control the third-party application to send a data processing request to a framework layer of the operating system in response to a shooting operation on a shooting interface of the third-party application, the data processing request being a request for indicating to process initial image data collected by the functional camera, and the sending module 701 is further configured to control the framework layer to send the data processing request to a hardware abstraction layer of the operating system; and
- a processing module 702, configured to control the hardware abstraction layer to process the initial image data in response to the data processing request to obtain target image data, and to control the hardware abstraction layer to send the target image data to the third-party application.

In an example, the shooting device 700 further includes:
- a determining module 703, configured to send a use request for using the functional camera to the framework layer of the operating system in response to a first operation for the third-party application; and
- a granting module 704, configured to control the framework layer to grant the use permission for the functional camera to the third-party application in response to the use request.

In an example, the determining module 703 is further configured to:
determine that the third-party application has the use permission to use the functional camera before sending the use request for using the functional camera to the framework layer of the operating system.

In an example, an application layer of the operating system is provided with a camera software development kit (SDK), the SDK is integrated in the third-party application, and the framework layer is provided with a camera permission module.

The determining module 703 is configured to control the third-party application to determine that the functional camera can be used in the following manner:
sending a query request for querying the use permission to the camera permission module by the SDK; and
determining, by the camera permission module, that the third-party application has the use permission to use the functional camera in response to the query request, and responding, by the camera permission module, a permission confirmation message to the third-party application.

In an example, the framework layer is provided with a camera granting module;
the determining module 703 controls the third party application to send the use request to the camera granting module; and
the granting module 704 is configured to control the camera granting module to grant the use permission to the third-party application in response to the use request.

In an example, under the condition of there being a plurality of the functional cameras, the granting module 704 controlling the framework layer to grant the use permission for the functional camera to the third-party application further includes:
granting the use permission for a Multi-Camera Simultaneous Opening Function for the plurality of the functional cameras to the third-party application, the Multi-Camera Simultaneous Opening Function having the function of simultaneously obtaining and displaying the shot image of each selected camera; and
the data processing request includes:
a request for indicating to process a first initial image data collected by a first functional camera and a second initial image data collected by a second functional camera, the first functional camera and the second functional camera being functional cameras selected from the plurality of the functional cameras.

The hardware abstraction layer processing the initial image data in response to the data processing request to obtain the target image data and sending the target image data to the third-party application includes:
the hardware abstraction layer processes the first initial image data in response to the data processing request to obtain a first target image data, and processes the second initial image data in response to the data processing request to obtain a second target image data, and sends the first target image data and the second target image data to the third-party application.

In an example, the functional camera includes at least one of an ultra-wide-angle camera, a telephoto camera, an ultra-telephoto camera and a macro camera.

Regarding the device in the above-mentioned examples, the specific mode by which each module performs the operations has been described in detail in the example of the method, and will not be described in detail here.

The disclosure further provides a computer readable storage medium on which computer program instructions are stored, and the steps of the shooting method provided by the disclosure are realized when the program instructions are executed by a processor.

Figure 8:
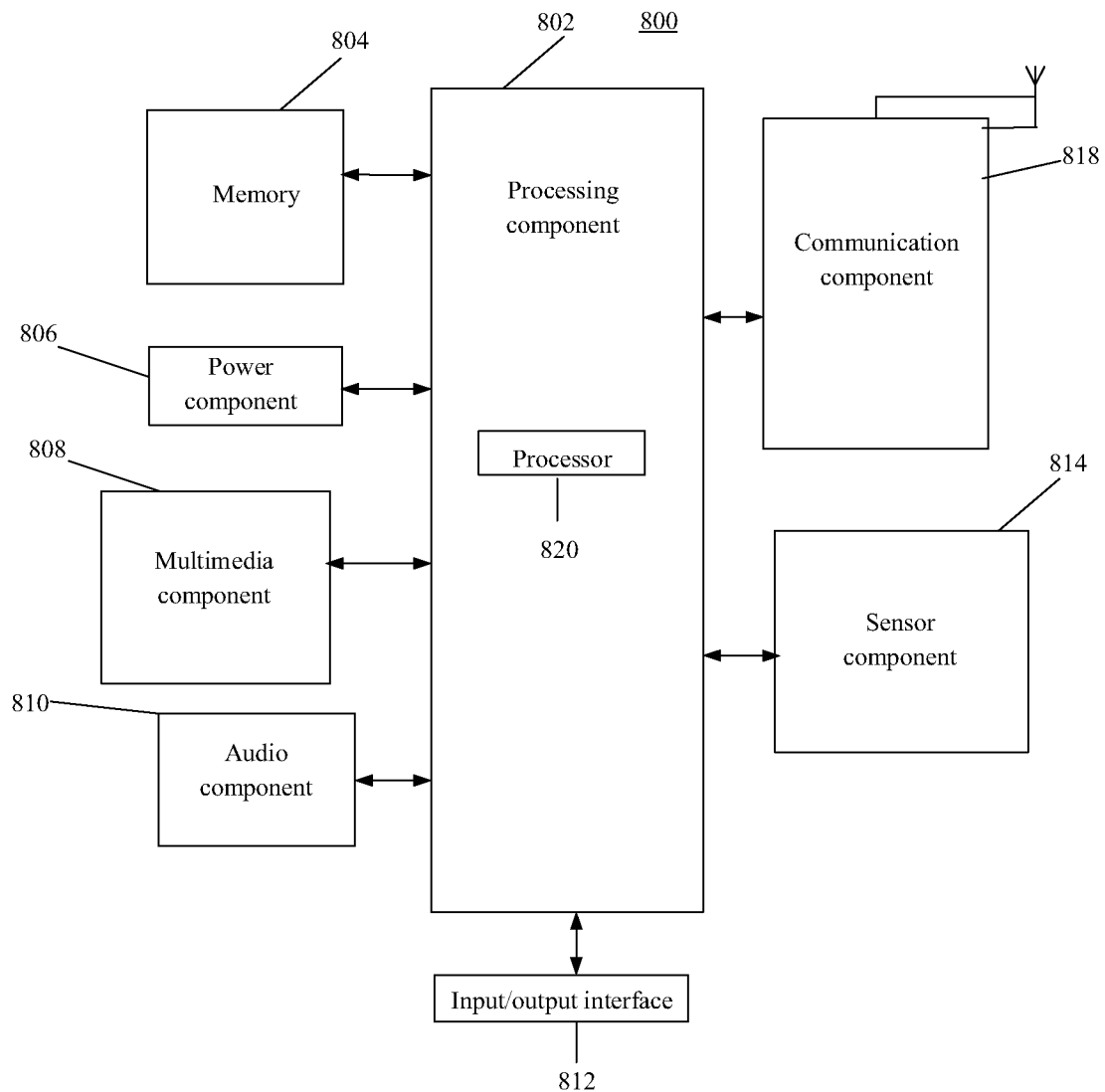
FIG. 8 is a block diagram of a device according to an example.

FIG. 8 is a block diagram of a device 800 for shooting in accordance with an example. For example, the device 800 may be a mobile phone, a computer, digital broadcast electronic device, messaging equipment, a game console, tablet equipment, medical equipment, fitness equipment, a personal digital assistant, etc.

With reference to FIG. 8, the device 800 may include one or more of the following components: a processing component 802, a memory 804, a power component 806, a multimedia component 808, an audio component 810, an input/output (I/O) interface 812, a sensor component 814, and a communication component 816.

The processing component 802 generally controls overall operations of the device 800, such as operations associated with displaying, telephone calling, data communications, camera operations, and recording operations. The processing component 802 may include one or more processors 820 to execute instructions to complete all or part of the steps of the above shooting method. Further, the processing component 802 may include one or more modules, to facilitate interaction between the processing component 802 and other components. For example, the processing component 802 may include a multimedia module to facilitate interaction between the multimedia component 808 and the processing component 802.

The memory 804 is configured to store various types of data to support operation at the device 800. Examples of these data include instructions, contact data, phonebook data, messages, pictures, videos, etc. for any application or method operated on the device 800. The memory 804 may be implemented by any type of volatile or non-volatile storage equipment, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic disk or an optical disk.

The power component 806 provides power to various components of the device 800. The power component 806 may include a power management system, one or more power sources, and other components associated with generating, managing, and distributing power for the device 800.

The multimedia component 808 includes a screen that provides an output interface between the device 800 and a user. In some examples, the screen may include a liquid crystal display (LCD) and a touch panel (TP). If the screen includes the touch panel, the screen may be implemented as a touch screen to receive an input signal from the user. The touch panel includes one or more touch sensors to sense touches, slides, and gestures on the touch panel. The touch sensor may not only sense boundaries of a touch or slide action, but also detect duration and pressure associated with the touch or slide action. In some examples, the multimedia component 808 includes a front camera and/or a rear camera. When the device 800 is in an operation mode, such as a shooting mode or a video mode, the front camera and/or the rear camera can receive external multimedia data. Each front camera and each rear camera can be a fixed optical lens system or have a focal length and the optical zooming capability.

The audio component 810 is configured to output and/or input an audio signal. For example, the audio component 810 includes a microphone (MIC) configured to receive an external audio signal when the device 800 is in an operating mode, such as a calling mode, a recording mode, and a voice recognition mode. The received audio signal may be further stored in a memory 804 or transmitted via a communication component 816. In some examples, the audio assembly 810 also includes a speaker for outputting the audio signal.

The I/O interface 812 provides an interface between the processing component 802 and the peripheral interface module. The peripheral interface module can be a keyboard, a click wheel, a button and the like. These buttons may include, but are not limited to, a home button, a volume button, a start button, and a lock button.

The sensor assembly 814 includes one or more sensors for providing various aspects of state evaluation for the device 800. For example, the sensor assembly 814 may detect an on/off state of the device 800, relative positioning of the components, such as a display and keypad of the device 800. The sensor assembly 814 may also detect a change in position of the device 800 or one component of the device 800, the presence or absence of contact of a user with the device 800, and the orientation or acceleration/deceleration of the device 800 and the temperature variation of the device 800. The sensor assembly 814 may include a proximity sensor configured to detect the presence of a nearby object without any physical contact. The sensor assembly 814 may also include a light sensor, such as a CMOS or CCD image sensor, for use in imaging applications. In some examples, the sensor assembly 814 may also include an acceleration sensor, a gyroscope sensor, a magnetic sensor, a pressure sensor, or a temperature sensor.

The communication component 816 is configured to facilitate wired or wireless communication between the device 800 and other equipment. The device 800 may access a wireless network based on a communication standard, such as WiFi, 2G or 3G, or a combination thereof. In one example, the communication component 816 receives broadcast signals or broadcast related information from an external broadcast management system via a broadcast channel. In one example, the communication component 816 also includes a near field communication (NFC) module to facilitate short-range communication. For example, the NFC module may be implemented based on a radio frequency identification (RFID) technology, an infrared data association (IrDA) technology, an ultra wide band (UWB) technology, a Bluetooth (BT) technology, and other technologies.

In an example, the device 800 may be implemented by one or more application specific integrated circuits (ASIC), digital signal processors (DSP), digital signal processing devices (DSPD), programmable logic devices (PLD), field programmable gate arrays (FPGA), controllers, microcontrollers, microprocessors, or other electronic components for performing the above shooting method.

In an example, a non-transitory computer-readable storage medium, such as a memory 804 including instructions executable by the processor 820 of the device 800 to complete the above shooting method, is also provided. For example, the non-transitory computer-readable storage medium may be an ROM, a random access memory (RAM), a CD-ROM, a magnetic tape, a floppy disk, optical data storage equipment, or the like.

In another example, there is also provided a computer program product including a computer program executable by a programmable device, the computer program having a code portion for performing the above-described shooting method when executed by the programmable device.

Additional non-limiting embodiments of the disclosure include:

1. A shooting method, performed by an electronic device, the electronic device includes an operating system and is provided with a functional camera, and an application layer of the electronic device is provided with a third-party application. The method includes:
   in response to a shooting operation on a shooting interface of the third-party application, sending a data processing request to a framework layer of the operating system by the third-party application, the data processing request being a request for indicating to process initial image data collected by the functional camera;
   sending the data processing request to a hardware abstraction layer of the operating system by the framework layer; and
   processing the initial image data by the hardware abstraction layer in response to the data processing request to obtain target image data, and sending the target image data to the third-party application by the hardware abstraction layer.
2. The shooting method according to embodiment 1, wherein, the method further includes:
   in response to a first operation for the third-party application, sending a use request for using the functional camera to the framework layer of the operating system; and
   granting use permission for the functional camera to the third-party application by the framework layer in response to the use request.
3. The shooting method according to any one of embodiments 1-2, wherein, before sending the use request for using the functional camera to the framework layer of the operating system, the method further includes:
   determining that the third-party application has the use permission to use the functional camera.
4. The shooting method according to any one of embodiments 1-3, wherein, the application layer of the operating system is provided with a camera software development kit (SDK), the SDK is integrated in the third-party application, and the framework layer is provided with a camera permission module;
   determining that the third-party application has the use permission to use the functional camera includes:
   sending a query request for querying the use permission to the camera permission module by the SDK; and
   determining, by the camera permission module, that the third-party application has the use permission to use the functional camera in response to the query request, and responding, by the camera permission module, a permission confirmation message to the third-party application.
5. The shooting method according to any one of embodiments 1-4, wherein, under the condition of there being a plurality of the functional cameras, granting the use permission for the functional camera to the third-party application further includes:
   granting the use permission for a Multi-Camera Simultaneous Opening Function for the plurality of the functional cameras to the third-party application, the Multi-Camera Simultaneous Opening Function having the function of simultaneously obtaining and displaying the shot image of each selected camera; and
   the data processing request includes:
   a request for indicating to process a first initial image data collected by a first functional camera and a second initial image data collected by a second functional camera, the first functional camera and the second functional camera being functional cameras selected from the plurality of the functional cameras;
   processing, by the hardware abstraction layer, the initial image data in response to the data processing request to obtain the target image data and sending, by the hardware abstraction layer, the target image data to the third-party application, includes:
   processing the first initial image data by the hardware abstraction layer in response to the data processing request to obtain a first target image data, and processing the second initial image data by the hardware abstraction layer in response to the data processing request to obtain a second target image data; and
   sending the first target image data and the second target image data to the third-party application by the hardware abstraction layer.
6. The shooting method according to any one of embodiments 1-5, wherein, the functional camera includes at least one of an ultra-wide-angle camera, a telephoto camera, an ultra-telephoto camera and a macro camera.
7. A shooting device, applied to an electronic device, the electronic device includes an operating system and is provided with a functional camera, an application layer of the electronic device is provided with a third-party application, and the shooting device includes:
   a sending module, configured to control the third-party application to send a data processing request to a framework layer of the operating system in response to a shooting operation on a shooting interface of the third-party application, the data processing request being a request for indicating to process initial image data collected by the functional camera, and the sending module is further configured to control the framework layer to send the data processing request to a hardware abstraction layer of the operating system; and
   a processing module, configured to control the hardware abstraction layer to process the initial image data in response to the data processing request to obtain target image data, and to control the hardware abstraction layer to send the target image data to the third-party application.
8. The shooting device according to embodiment 7, wherein, the device further includes:
   a determining module, configured to send a use request for using the functional camera to the framework layer of the operating system in response to a first operation for the third-party application; and
   a granting module, configured to control the framework layer to grant use permission for the functional camera to the third-party application in response to the use request.
9. The shooting device according to any one of embodiments 7-8, wherein, the determining module is further configured to:
   determine that the third-party application has the use permission to use the functional camera before sending the use request for using the functional camera to the framework layer of the operating system.
10. The shooting device according to any one of embodiments 7-9, wherein, the application layer of the operating system is provided with a camera software development kit (SDK), the SDK is integrated in the third-party application, and the framework layer is provided with a camera permission module;
    the determining module determines that the third-party application has the use permission to use the function camera in the following manner:

sending a query request for querying the use permission to the camera permission module by the SDK; and the camera permission module determines that the third-party application has the use permission to use the functional camera in response to the query request, and responds a permission confirmation message to the third-party application.

11. The shooting device according to any one of embodiments 7-10, wherein, under the condition of there being a plurality of the functional cameras, controlling the framework layer to grant the use permission for the functional camera to the third-party application by the granting module further includes:

granting the use permission for a Multi-Camera Simultaneous Opening Function for the plurality of the functional cameras to the third-party application, the Multi-Camera Simultaneous Opening Function having the function of simultaneously obtaining and displaying the shot image of each selected camera; and the data processing request includes:

a request for indicating to process a first initial image data collected by a first functional camera and a second initial image data collected by a second functional camera, the first functional camera and the second functional camera being functional cameras selected from the plurality of the functional cameras.

The hardware abstraction layer processing the initial image data in response to the data processing request to obtain the target image data and sending the target image data to the third-party application, includes:

the hardware abstraction layer processes the first initial image data in response to the data processing request to obtain a first target image data, and processes the second initial image data in response to the data processing request to obtain a second target image data; and sends the first target image data and the second target image data to the third-party application.

12. The shooting device according to any one of embodiments 7-11, wherein, the functional camera includes at least one of an ultra-wide-angle camera, a telephoto camera, an ultra-telephoto camera and a macro camera.

The technical solution according to the examples of the disclosure can include the following beneficial effects: in response to the shooting operation on the shooting interface of the third-party application, the processing request for processing initial image data collected by the functional camera can be sent to the hardware abstraction layer of the operating system through the third-party application. The hardware abstraction layer processes the initial image data in response to the data processing request to obtain the target image data and sends the target image data to the third-party application, so that the third-party application calls the functional camera for shooting, and the richness of shooting through the third-party application is improved.

Other examples of the present disclosure will be readily conceived by those skilled in the art after taking into account the specification and practicing the present disclosure. The present disclosure aims to cover any variation, use or adaptive variation of the disclosure that follow the general principles of the disclosure and include the known common knowledge or habitual technical means in the art that are not disclosed by the disclosure. The description and examples are considered as examples, and the true scope and spirit of the disclosure are indicated by the following claims.

It should be understood that the disclosure is not limited to the precise structures that have been described above and shown in the drawings, and that various modifications and changes can be made without departing from its scope. The scope of the present disclosure is limited by the appended claims

What is claimed is:

1. A shooting method, wherein the shooting method is performed by an electronic device, the electronic device comprises an operating system and is provided with a functional camera, and an application layer of the electronic device is provided with a third-party application, the application layer is provided with a camera software development kit (SDK), the SDK is integrated in the third-party application, and the method comprises:

in response to a shooting operation on a shooting interface of the third-party application, sending, through the SDK, a data processing request to a framework layer of the operating system by the third-party application, the data processing request being a request for indicating to process initial image data collected by the functional camera;

sending the data processing request to a hardware abstraction layer of the operating system by the framework layer; and processing the initial image data by the hardware abstraction layer in response to the data processing request to obtain target image data, and sending the target image data from the hardware abstraction layer to the third-party application through the framework layer;

wherein sending, through the SDK, the data processing request to the framework layer of the operating system by the third-party application, comprises: sending, by the third-party application, the data processing request to a camera application service of the framework layer through the SDK via a camera application interface of the framework layer;

wherein sending the data processing request to the hardware abstraction layer of the operating system by the framework layer, comprises: sending the data processing request received by the camera application service to the hardware abstraction layer via a framework layer interface of the framework layer.

2. The method according to claim 1, wherein the method further comprises:

in response to a first operation for the third-party application, sending a use request for using the functional camera to the framework layer of the operating system; and granting an use permission for the functional camera to the third-party application by the framework layer in response to the use request.

3. The method according to claim 2, wherein before sending the use request for using the functional camera to the framework layer of the operating system, the method further comprises:

determining that the third-party application has the use permission to use the functional camera.

4. The method according to claim 3, wherein the framework layer is provided with a camera permission module;

determining that the third-party application has the use permission to use the functional camera comprises:

sending a query request for querying the use permission to the camera permission module by the SDK; and determining that the third-party application has the use permission for the functional camera by the camera permission module in response to the query request, and responding a permission confirmation message to the third-party application by the camera permission module.

5. The method according to claim 2, wherein under the condition of there being a plurality of the functional cameras, granting the use permission for the functional camera to the third-party application further comprises:
granting use permission for a Multi-Camera Simultaneous Opening Function for the plurality of the functional cameras to the third-party application, wherein the Multi-Camera Simultaneous Opening Function has the function of simultaneously obtaining and displaying the shot image of each selected camera; and
the data processing request comprises:
a request for indicating to process a first initial image data collected by a first functional camera and a second initial image data collected by a second functional camera, wherein the first functional camera and the second functional camera are functional cameras selected from the plurality of the functional cameras;
processing the initial image data by the hardware abstraction layer in response to the data processing request to obtain the target image data and sending the target image data from the hardware abstraction layer to the third-party application through the framework layer comprises:
processing the first initial image data by the hardware abstraction layer in response to the data processing request to obtain a first target image data, and processing the second initial image data by the hardware abstraction layer in response to the data processing request to obtain a second target image data; and
sending the first target image data and the second target image data from the hardware abstraction layer to the third-party application through the framework layer.

6. The method according to claim 1, wherein the functional camera comprises at least one of an ultra-wide angle camera, a telephoto camera, an ultra-telephoto camera and a macro camera.

7. The method according to claim 4, wherein the permission confirmation message includes identification data of the functional camera;
sending the use request for using the functional camera to the framework layer of the operating system, comprises: sending, by the third-party application, the use request for using the functional camera to the framework layer of the operating system according to the identification data.

8. A shooting device, the shooting device is applied to an electronic device, the electronic device comprises an operating system and is provided with a functional camera, and an application layer of the electronic device is provided with a third-party application, the application layer is provided with a camera software development kit (SDK), the SDK is integrated in the third-party application, and the shooting device comprising:
a processor; and
a memory, configured to store processor executable instructions;
wherein the processor is configured to:
in response to a shooting operation on a shooting interface of the third-party application, control the third-party application to send, through the SDK, a data processing request to a framework layer of the operating system, the data processing request being a request for indicating to process initial image data collected by the functional camera;
control the framework layer to send the data processing request to a hardware abstraction layer of the operating system; and
control the hardware abstraction layer to process the initial image data in response to the data processing request to obtain target image data, and control the hardware abstraction layer to send the target image data to the third-party application through the framework layer;
wherein send, through the SDK, the data processing request to the framework layer of the operating system, comprises: sending the data processing request to a camera application service of the framework layer through the SDK via a camera application interface of the framework layer;
wherein send the data processing request to the hardware abstraction layer of the operating system, comprises: sending the data processing request received by the camera application service to the hardware abstraction layer via a framework layer interface of the framework layer.

9. The shooting device according to claim 8, wherein the processor is further configured to:
in response to a first operation for the third-party application, control the third-party application to send a use request for using the functional camera to the framework layer of the operating system; and
control the framework layer to grant use permission for the functional camera to the third-party application in response to the use request.

10. The shooting device according to claim 9, wherein the processor is further configured to:
before controlling the third-party application to send the use request for using the functional camera to the framework layer of the operating system, control the third-party application to determine that the third-party application has the use permission to use the functional camera.

11. The shooting device according to claim 10, wherein the framework layer is provided with a camera permission module;
the processor is further configured to:
control the third-party application to send a query request for querying the use permission to the camera permission module by the SDK; and
control the camera permission module to determine that the third-party application has the use permission for the functional camera in response to the query request, and to respond a permission confirmation message to the third-party application.

12. The shooting device according to claim 9, wherein under the condition of there being a plurality of the functional cameras, the processor is further configured to:
control the framework layer to grant use permission for a Multi-Camera Simultaneous Opening Function for the plurality of the functional cameras to the third-party application, wherein the Multi-Camera Simultaneous Opening Function has the function of simultaneously obtaining and displaying the shot image of each selected camera; and
the data processing request comprises: a request for indicating to process a first initial image data collected by a first functional camera and a second initial image data collected by a second functional camera, wherein the first functional camera and the second functional camera are functional cameras selected from the plurality of the functional cameras;

the processor is further configured to:
control the hardware abstraction layer to process the first initial image data in response to the data processing request to obtain a first target image data, and to process the second initial image data in response to the data processing request to obtain a second target image data; and
control the hardware abstraction layer to send the first target image data and the second target image data to the third-party application through the framework layer.

13. The shooting device according to claim 8, wherein the functional camera comprises at least one of an ultra-wide angle camera, a telephoto camera, an ultra-telephoto camera and a macro camera.

14. A non-transitory computer readable storage medium on which computer program instructions are stored, wherein, the storage medium is applied to an electronic device, the electronic device comprises an operating system and is provided with a functional camera, and an application layer of the electronic device is provided with a third-party application, the application layer is provided with a camera software development kit (SDK), the SDK is integrated in the third-party application, and when the program instructions are executed by a processor, the processor is configured to:
in response to a shooting operation on a shooting interface of the third-party application, control the third-party application to send, through the SDK, a data processing request to a framework layer of the operating system, the data processing request being a request for indicating to process initial image data collected by the functional camera;
control the framework layer to send the data processing request to a hardware abstraction layer of the operating system; and
control the hardware abstraction layer to process the initial image data in response to the data processing request to obtain target image data, and control the hardware abstraction layer to send the target image data to the third-party application through the framework layer;
wherein send, through the SDK, the data processing request to the framework layer of the operating system, comprises: sending the data processing request to a camera application service of the framework layer through the SDK via a camera application interface of the framework layer;
wherein send the data processing request to the hardware abstraction layer of the operating system, comprises: sending the data processing request received by the camera application service to the hardware abstraction layer via a framework layer interface of the framework layer.

15. The storage medium according to claim 14, wherein the processor is further configured to:
in response to a first operation for the third-party application, control the third-party application to send a use request for using the functional camera to the framework layer of the operating system; and
control the framework layer to grant use permission for the functional camera to the third-party application in response to the use request.

16. The storage medium according to claim 15, wherein the processor is further configured to:
before controlling the third-party application to send the use request for using the functional camera to the framework layer of the operating system, control the third-party application to determine that the third-party application has the use permission to use the functional camera.

17. The storage medium according to claim 16, wherein the framework layer is provided with a camera permission module;
the processor is further configured to:
control the third-party application to send a query request for querying the use permission to the camera permission module by the SDK; and
control the camera permission module to determine that the third-party application has the use permission for the functional camera in response to the query request, and to respond a permission confirmation message to the third-party application.

18. The storage medium according to claim 15, wherein under the condition of there being a plurality of the functional cameras, the processor is further configured to:
control the framework layer to grant use permission for a Multi-Camera Simultaneous Opening Function for the plurality of the functional cameras to the third-party application, wherein the Multi-Camera Simultaneous Opening Function has the function of simultaneously obtaining and displaying the shot image of each selected camera; and
the data processing request comprises: a request for indicating to process a first initial image data collected by a first functional camera and a second initial image data collected by a second functional camera, wherein the first functional camera and the second functional camera are functional cameras selected from the plurality of the functional cameras;
the processor is further configured to:
control the hardware abstraction layer to process the first initial image data in response to the data processing request to obtain a first target image data, and to process the second initial image data in response to the data processing request to obtain a second target image data; and
control the hardware abstraction layer to send the first target image data and the second target image data to the third-party application through the framework layer.

19. The storage medium according to claim 14, wherein the functional camera comprises at least one of an ultra-wide angle camera, a telephoto camera, an ultra-telephoto camera and a macro camera.

\* \* \* \* \*

UNITED STATES PATENT AND TRADEMARK OFFICE
CERTIFICATE OF CORRECTION

PATENT NO. : 12,207,000 B2
APPLICATION NO. : 17/733511
DATED : January 21, 2025
INVENTOR(S) : Yuqing Gu et al.

Page 1 of 1

It is certified that error appears in the above-identified patent and that said Letters Patent is hereby corrected as shown below:

In the Specification

In Column 1, Line 8, delete "2021116274552," and insert -- 202111627455.2, --, therefor.

In Column 5, Lines 25-26, delete "disclosure" and insert -- disclosure. --, therefor.

In Column 10, Line 43, delete "ultra wide band" and insert -- ultra-wideband --, therefor.

In Column 14, Line 4, delete "claims" and insert -- claims. --, therefor.

Signed and Sealed this
Fifteenth Day of April, 2025

Coke Morgan Stewart
*Acting Director of the United States Patent and Trademark Office*